United States Patent [19]

Antonov

[11] Patent Number: 5,514,043
[45] Date of Patent: May 7, 1996

[54] RATIO CHANGE CONTROL METHOD AND RELATED GEAR TRANSMISSION DEVICE, IN PARTICULAR FOR A VEHICLE

[75] Inventor: Roumen Antonov, Paris, France

[73] Assignee: Antonov Automotive North America B.V., Al Rotterdam, Netherlands

[21] Appl. No.: 362,467
[22] PCT Filed: Jul. 2, 1993
[86] PCT No.: PCT/FR93/00674
§ 371 Date: Jan. 3, 1995
§ 102(e) Date: Jan. 3, 1995
[87] PCT Pub. No.: WO94/01696
PCT Pub. Date: Jan. 20, 1994

[30] Foreign Application Priority Data

Jul. 3, 1992 [FR] France .................. 92 08236

[51] Int. Cl.[6] ................................. F16H 47/04
[52] U.S. Cl. ............................ 475/108; 475/262
[58] Field of Search ..................... 475/108, 262

[56] References Cited

U.S. PATENT DOCUMENTS

| | | | |
|---|---|---|---|
| 1,966,979 | 7/1934 | Gardner | 475/108 |
| 2,133,276 | 10/1938 | Ballantyne | 475/108 |
| 2,135,917 | 11/1938 | Seybold | 475/108 |
| 3,130,607 | 4/1964 | Kraemer | 475/103 |
| 4,322,988 | 4/1982 | Hill | 475/75 |

FOREIGN PATENT DOCUMENTS

| | | |
|---|---|---|
| 661325 | 7/1929 | France . |
| 1191526 | 10/1959 | France . |
| 2368652 | 5/1978 | France . |

*Primary Examiner*—Dirk Wright
*Attorney, Agent, or Firm*—Kenyon & Kenyon

[57] ABSTRACT

A transmission device including a planetary gear train with a ring gear connected to the input, and a sun wheel counter-rotationally locked by a free-wheel. A planet carrier is connected to the output shaft. The ring gear and the planet pinion carrier my be coupled via a clutch which is compression-actuated by fly-weights to ensure direct drive. When the clutch is released by an axial thrust caused by the helical gearing and countering that of the fly-weights, the sun-wheel is immobilized by the free-wheel and the device operates as a reducing mechanism. The planetary gear train is arranged as an oil pump delivering through a duct and through the stack of clutch discs. When the clutch is actuated by the fly-weights, the delivery path is closed off, and the meshing motion between the gears forming the oil pump tends to be eliminated as a result. Therefore, the frictional process of the discs need only immobilize the gears to achieve direct drive. Ratio changes may be made more flexible, and clutch wear and heating may be reduced.

14 Claims, 3 Drawing Sheets

RATIO CHANGE CONTROL METHOD AND RELATED GEAR TRANSMISSION DEVICE, IN PARTICULAR FOR A VEHICLE

The present invention concerns a transmission ratio change control method in a gear transmission device.

The present invention also concerns a device for implementing this method.

Transmission devices are known in which a direct drive ratio or a speed change ratio is achieved depending on whether two sets of teeth that mesh together are, respectively, stationary in relation to each other or in meshing motion in relation to each other.

In order to pass from one ratio to the other, one can, for example, squeeze or release a clutch which makes the two sets of teeth integral, directly or indirectly, to achieve the direct drive ratio, or, for example, brake one of the sets of teeth on a structure of the transmission device so that the other set of teeth rolls on the stationary one.

These clutch or brake controls, whether manual or automatic, may operate more or less abruptly depending on the circumstances. They require a work of friction which generates heat and wear.

FR-A-1 191 526 or U.S. Pat. No. 3,103,607, disclose transmission devices in which such changes are made by releasing or not releasing the delivery of at least one additional gear pump, whose impeller is connected to a rotating element of the combination of teeth, to release or not release this rotating element. But these arrangements are complex, heavy and cumbersome.

FR-2 190 220 describes a limited-slipping differential in which the combination of teeth transmits the power and is itself arranged to form an hydraulic pump whose outlet path becomes narrower as the relative speed of the teeth increases. It also has means which close off the outlet orifice when the oil temperature increases.

The aim of this invention is therefore to propose a method and a device in which the ratio changes may be made flexibly and with reduced wear, using simple means.

According to the invention, a ratio change control method is proposed in a transmission device comprising a combination of meshing sets of teeth capable of operating in a state of relative mobility in which the combination of teeth transmits power in a first transmission ratio between a transmission output and input, or in a state of relative fixity to achieve a second transmission ratio between the transmission output and input, the combination of meshing teeth taking the form of an hydraulic gear pump, a method whereby the second transmission ratio is controlled by substantially closing off the flow at the gear pump outlet, the first transmission ratio is controlled by releasing the flow at the gear pump outlet, and in order to pass from the first to the second ratio, after having at least partly closed off the flow at the gear pump outlet, a clutch is made to pass into the coupled state, said clutch tending in the coupled state to make the combination of teeth operate in the state of relative fixity and allowing in the uncoupled state the combination of teeth to assume the state of relative mobility corresponding to the first transmission ratio.

According to a second aspect of the invention, there is proposed a transmission device which has at least two ratios and comprises a combination of sets of teeth capable of operating in a state of relative mobility in which the combination transmits power in a first speed ratio between the transmission input and output, or in a state of relative fixity to achieve a second speed ratio between the transmission input and output, means for guiding oil through the regions of two sets of teeth in the combination which move towards each other during operation in he first transmission ratio, means for oil intake into the gaps between the teeth in at least one of these regions, an oil delivery path starting from a region where the two teeth start to mesh, ratio change control means for selectively opening or substantially closing off the oil delivery path to control the operation in the first transmission ratio or operation in the second transmission ratio respectively, and a clutch which selectively connects two rotating elements connected at least indirectly to the sets of teeth of the combination so that the combination of teeth works in the second transmission ratio when the clutch is in a coupled state, the ratio change control means also comprising means that, on passing from the first to the second transmission ratio, control the passage of the clutch to the coupled state after the said oil delivery path has been at least partially closed off.

Thus, the ratio change is achieved by altering the conditions of flow at the outlet of an hydraulic pump made up of the combination of teeth. This is made possible by the fact that one of the transmission ratios corresponds to the immobilization of the teeth in relation to each other and not, as in previous state-of-the-art devices, to the immobilization of a particular set of teeth in relation to the transmission housing. The oil, due to its relative compressibility, dampens mechanical shocks. To pass from the first to the second ratio, closing off the flow from the hydraulic pump outlet, at least partially, sharply reduces the coupling effort to be performed by the clutch. Subsequently, the clutch, once coupled, ensures the relative fixity of the teeth.

According to an advantageous version of the invention, the oil delivery path is made to pass between the friction faces of the clutch, so that this path tends to close off when the clutch is being engaged.

Thus, to control the passage into direct drive, the clutch is engaged. As soon as the friction faces move towards each other, the resulting increase in the loss of pressure in the oil delivery path creates in the hydraulic pump a force which tends to slow down the relative movement of the teeth in the combination. This occurs even before there is any actual contact between the clutch friction faces. When the faces are in contact with each other, and the friction between the faces begins, the oil pump only has an escape path corresponding to a very great loss of pressure and the relative motion of the teeth is therefore largely eliminated. The actual task of the clutch now therefore consists merely in ending the immobilization of the teeth in relation to each other.

In this way, remarkable progressiveness is introduced and at the same time the work of friction to be performed by the clutch is considerably reduced, and consequently so is clutch wear and heating, with the additional advantage of permanently bathing the friction faces of the clutch with hydraulic fluid, which helps to protect and cool them.

Under these conditions, a smaller, yet longer lasting clutch may be used.

Further features and advantages of the invention shall emerge from the following description, relating to examples which are in no way restrictive.

In the attached drawings:

FIG. 5 is a partial schematic view of the epicyclic train arranged as an oil pump, viewed parallel to the device's axis;

FIG. 6 is a sectional view of a grooved disc along Line VI—VI in FIG. 2;

FIGS. 7 and 8 are two sectional views of the discs along Line VII—VII in FIG. 2, when the clutch is engaged and released respectively; and FIGS. 9 and 10 are similar views to FIG. 6, but relating to two other embodiments of the grooved discs, FIG. 10 also showing the two adjacent smooth discs.

Figure 1:
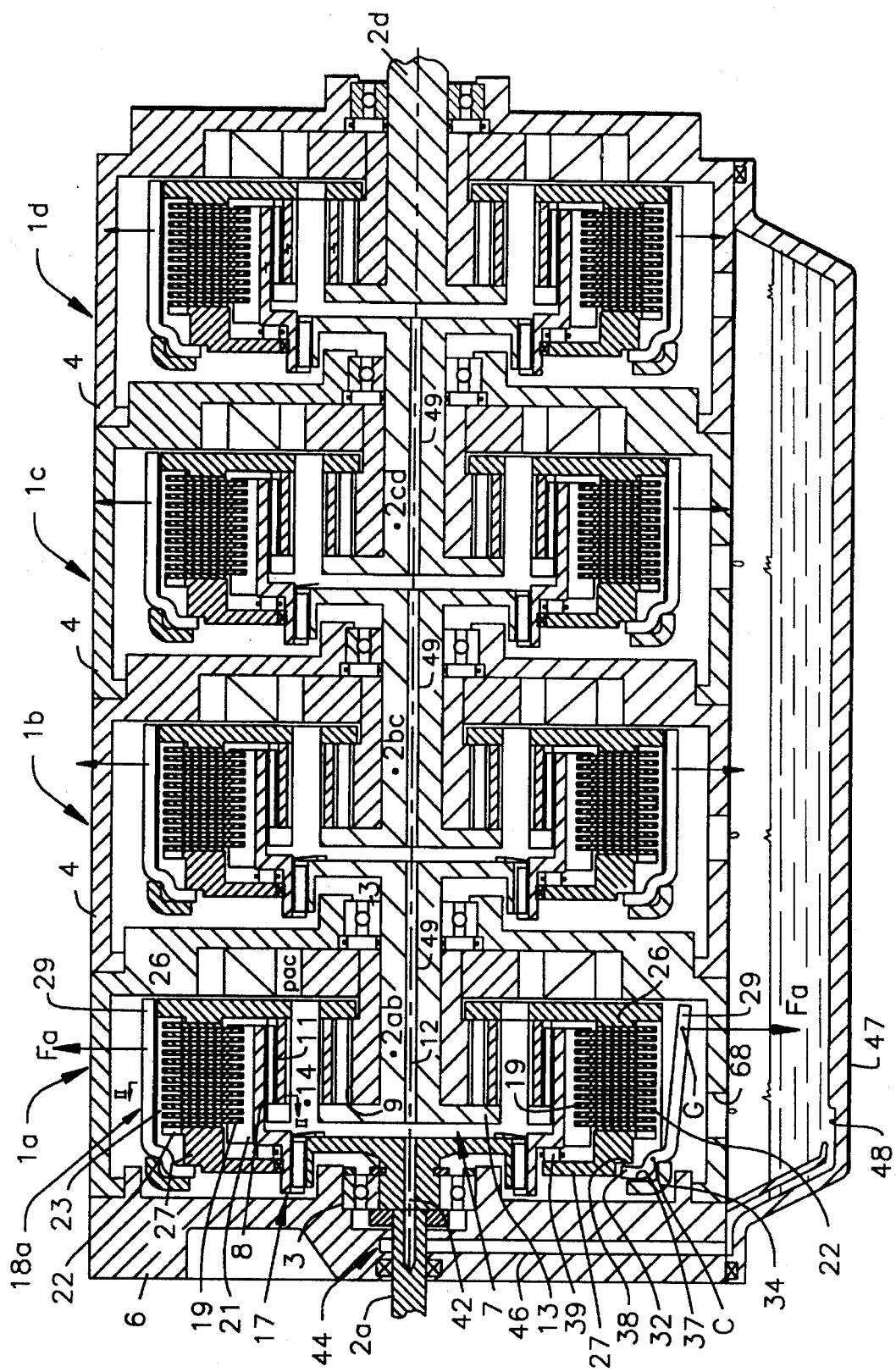
FIG.1 is a schematic longitudinal section of a five-ratio transmission device according to the invention, operating in the first ratio at the top of the figure and in the second ratio at the bottom of the figure, some sealing means having been omitted.

The five-ratio transmission device shown in FIG. 1, intended in particular for a motorcar, comprises four successive modules 1a, 1b, 1c, 1d, each with two ratios, mounted in series between an input shaft 2a and an output shaft 2d of the transmission device. Input shaft 2a can be connected to the driven disc of a clutch, and also constitutes the input shaft in module 1a. At the same time, output shaft 2d constitutes the output shaft of module 1d and can be connected to the input of a differential to drive the driving wheels of a vehicle.

Along axis 12 of the transmission device, between input shaft 1a and output shaft 2d, there are three successive intermediate shafts 2ab, 2bc, 2cd which each constitute the output shaft of modules 1a, 1b, 1c respectively located upstream, and the input shaft of modules 1b, 1c, 1d respectively located downstream. Intermediate shafts 2ab, 2bc and 2cd are each supported by a roller bearing 3 in a housing 4 of modules 1a, 1b and 1c of which they constitute the output shaft. Housings 4 of the modules are assembled together to form, with an end plate 6 supporting input shaft 2a by means of another roller bearing 3, the housing of the transmission device assembly.

We shall now describe in greater detail module 1a, this description being valid also for modules 1b, 1c and 1d which are identical to module 1a except for the differences indicated.

An epicyclic train comprises a crown wheel 8 with internal teeth and a sun gear 9 with external teeth, both meshing with planet gears 11 supported, at equal angular intervals around axis 12 of the transmission device, by a planet gear carrier 13 connected rigidly to output shaft 2ab. Planet gears 11 can rotate freely around eccentric trunnions 14 of planet gear carrier 13. Sun gear 9 can turn freely around axis 12 of the transmission device in relation to output shaft 2ab which it surrounds. However, a freewheel device 16 prevents sun gear 9 from turning backwards, that is in the opposite direction to the normal direction of rotation of input shaft 2a, in relation to housing 4 of the module.

Crown wheel 8 is connected in rotation to input shaft 2a of the module by means of splines 17 enabling crown wheel 8 to slide in relation to input shaft 2a parallel to axis 12 of the transmission device.

A multi-disc oil-bathed clutch 18a is arranged around crown wheel It comprises a stack of annular discs 19 alternating with annular discs 22. Discs 19 are connected in rotation to crown wheel 8 with the possibility of sliding axially. For this purpose, discs 19 have teeth 20 engaged in outer splines 21 integral with crown wheel 8 (see FIG. 2). Discs 22 are connected in rotation, with the possibility of sliding axially, to planet gear carrier 13. For this purpose, discs 22 have teeth 25 engaged in splines 23 integral with planet gear carrier 13.

Splines 21 are blind whereas splines 23 located radially round the outside comprise axial slots passing between blades 24. In a conventional manner, splines 23, located radially outside splines 21, have a much greater pitch than splines 21: a smaller number splines are needed since the circumferential effort to be transmitted for a given rotational torque is less, and this smaller number of splines is spread around a greater circumference.

Figure 3:
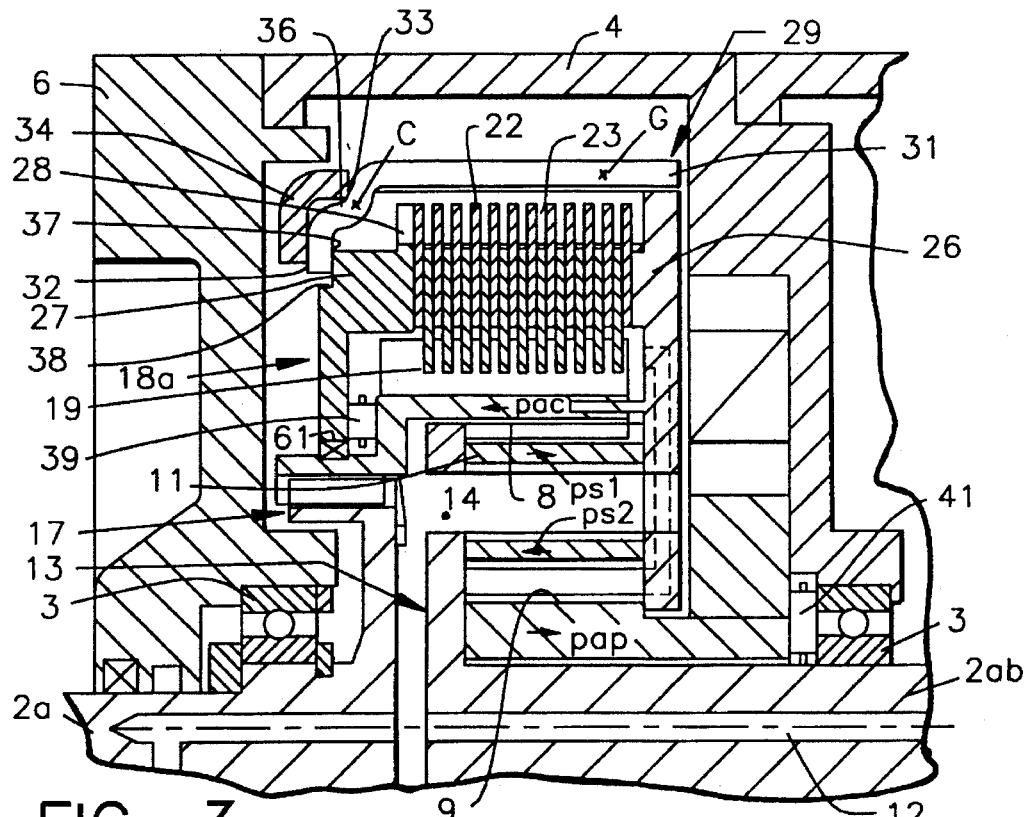
FIG. 3 is an enlarged-scale detail of FIG. 1.

As FIG. 3 shows more clearly, the stack of discs 19 and 22 can be squeezed axially between a fixed plate 26 integral with planet gear carrier 13 and a movable plate 27 which is integral with planet gear carrier 13 for rotations around axis 12 of the device, but can slide in relation to planet gear carrier 13 and in particular in relation to plate 26, parallel to axis 12 of the device, thanks to external teeth 28 engaged in grooves 23 integral with planet gear carrier 13.

Figure 2:
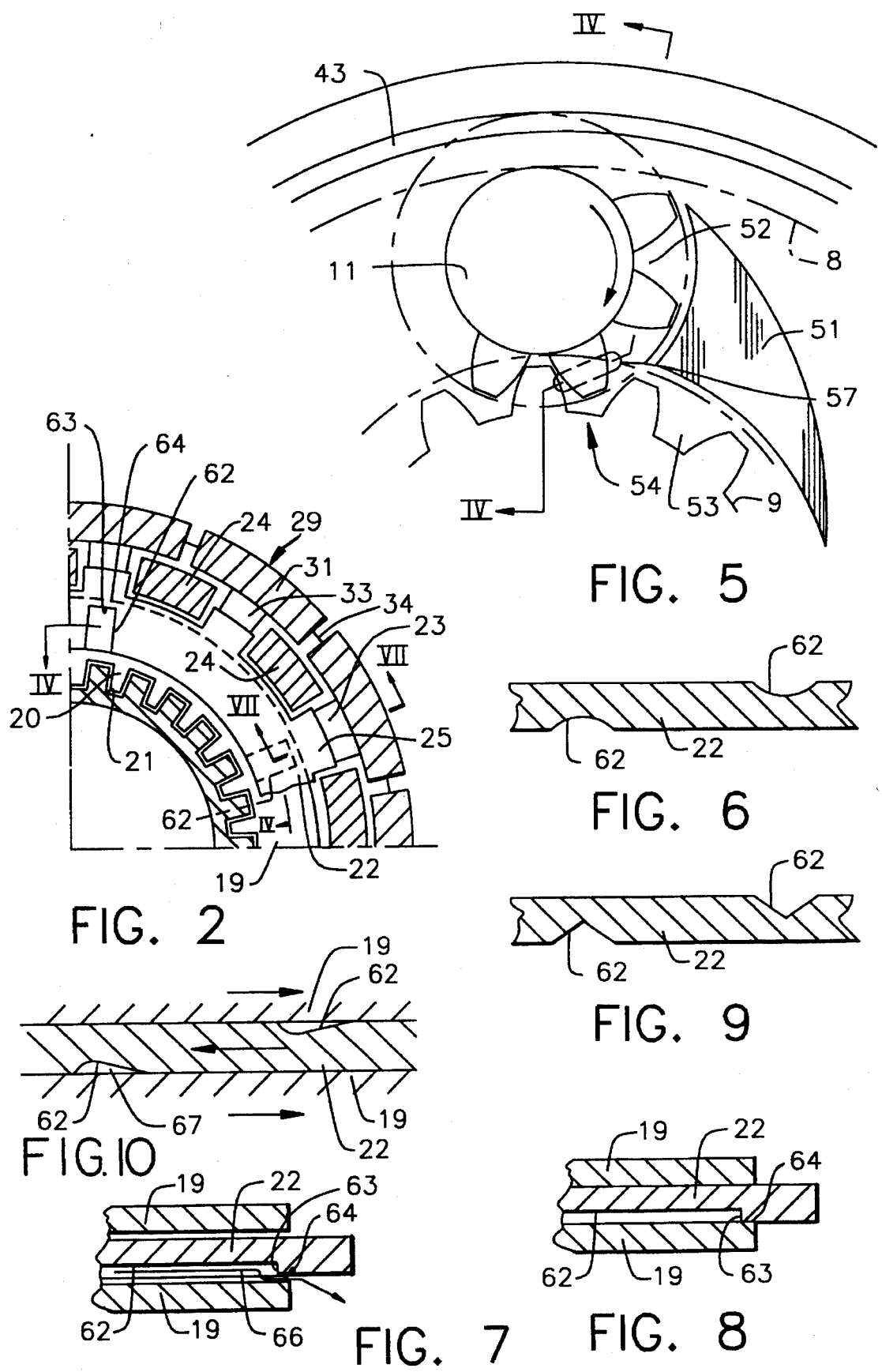
FIG. 2 is a partial sectional view along II—II in FIG. 1.

Furthermore, fly-weights 29 are arranged in a ring around clutch 18a, as shown in FIG. 2.

Each fly-weight has a massive body 31 located radially around the outside of discs 19 and 22 and an operating tip 32 resting against an outer face 38 of movable plate 27. Tip 32 is connected to massive body 31 by a catch collar 33 which passes through splines 23 so that fly-weights 29 are driven in rotation by planet gear carrier 13 around axis 12 of the device. Splines 23 extend axially between fixed plate 26 of the clutch and an angled hoop 34. One face 36 of hoop 34, turned towards axis 12, prevents collar 33 and operating tip 32 from moving radially outwards. A radial face 37 of hoop 34 serves as an axial stop for tip 32 and thus enables tip 32 variably to limit the distance between clutch plates 26 and 27, as described below.

In fact, hoop 34 enables each fly-weight 29 to pivot around a geometrical axis C located tangentially in relation to axis 12 of the device and passing through collar 33 of the fly-weight. The centre of gravity G of the fly-weight is located in massive body 31, in a position which in relation to axis C is at a certain distance measured parallel to axis 12 of the device.

Thus, as shown for module 1a at the bottom of FIG. 1, the rotation of planet gear carrier 13 tends to make fly-weights 29 pivot radially outwards around their tangential axis C due to the action of their centrifugal force Fa. Operating tip 32 then assumes an oblique position which increases the distance, measured parallel to axis 12, between radial face 37 of hoop 34 and radial face 38, located opposite, belonging to movable plate 27 of the clutch. Movable plate 27 is thus moved in the direction of fixed plate 26 squeezing discs 19 and 22 together. This gives rise to a coupling between input shaft 2a and output shaft 2ab of the module, which corresponds to direct drive operation.

By contrast, when fly-weights 29 are in the rest position shown at the top of FIG. 1 and in FIG. 3, the distance between fixed plate 26 and movable plate 27 of the clutch is such that discs 19 and 22 slide against each other without transmitting torque between them. In this case, planet gear carrier 13 can turn at a different speed to that of input shaft 2a, and it tends to be immobilized by the load that must drive the module's output shaft 2ab. Consequently, planet gears 11 tend to act as motion reversers, that is, to make sun gear 9 rotate in the opposite direction to the direction of rotation of crown wheel 8. But this is prevented by free wheel 16. Sun gear 9 is thus immobilized by free wheel 16 and planet gear carrier 13 turns at a speed which is intermediate between the zero speed of sun gear 9 and the speed of crown wheel 8 and input shaft 2a.

As FIGS. 1 and 3 show, crown wheel 8 and movable plate 27 are resting axially against each other by means of an axial stop 39. When the fly-wheels 29 rise and push movable plate 27 toward fixed plate 26, this movement is transmitted by axial stop 39 to crown wheel 8 which therefore also moves towards fixed plate 26.

On the other hand, the teeth of crown wheel 8, planet gears 11 and sun gear 9 are helical. Thus, in each pair of sets of teeth engaging under load, opposing axial thrusts emerge proportional to the circumferential force transmitted and therefore to the torque on input shaft 2a and the torque on output shaft 2ab. The pitch of the teeth is selected so that axial thrust Pac originating in crown wheel 8 when it transmits torque is pointing towards the direction that distances crown wheel 8 and with the latter movable plate 27 from fixed clutch plate 26. Planet gears 11, which mesh not only with crown wheel 8 but also with sun gear 9, undergo two opposing axial reactions PS1 and PS2, which balance each other out, and sun gear 9 undergoes, taking into account its meshing with planet gears 11, an axial thrust Pap which is equal in intensity and opposite to axial thrust Pac of crown wheel 8. The assembly is such that thrust Pap of sun gear 9 is transmitted to planet gear carrier 13. Thus axial thrusts Pac and Pap, equal and opposing, are transmitted one to movable plate 27 and the other to fixed plate 26 in the direction tending to release clutch 18a. These forces also tend to draw radial face 37 of hoop 34 and the opposing radial face 38 of movable plate 27 together and thus set tip 32 of the fly-weights upright again and return fly-weights 29 to their rest position as shown at the top of FIG. 1 and in FIG. 3.

Axial thrust Pap of sun gear 9 is taken up by bearing 3 thanks to an axial stop 41 interposed between sun gear 9 and bearing 3. With this assembly, planet gear carrier 13 and consequently fixed plate 26 as well as hoop 34 retaining fly-weights 29 are immobile in relation to housing 4 of the module. Moreover, input shaft 2a is immobilized in relation to end plate 6 thanks to the assembly of its bearing 3. Thus, movable clutch plate 27 and crown wheel 8 move axially in relation to shafts 2a and 2ab, planet gear carrier 13 and the housing. This is enabled in particular by splines 17 by means of which crown wheel 8 is driven by shaft 2a.

Thus, starting from the situation shown in FIG. 3, so long as the torque transmitted to the module by input shaft 2a is such that axial thrusts Pac and Pap in crown wheel 8 and sun gear 9 are sufficient to keep fly-weights 29 in the rest position shown in FIG. 3 despite the centrifugal force undergone by these fly-weights taking into account the speed of rotation of output shaft 2ab, the module works in reducer operation. If the speed of rotation increases and the torque remains unchanged, there reaches a point when the centrifugal force produces between hoop 34 and movable plate 27 axial distancing forces with a greater intensity than axial thrusts Pac and Pap, and movable plate 27 is pushed towards plate 26 to achieve direct drive. We shall describe later in detail the process of passing into direct drive and certain elements that come into operation when this process occurs, which more especially form the object of the present invention.

When clutch 18a is engaged, the teeth of epicyclic train 7 no longer work, that is they no longer transmit any force and therefore do not give rise to any axial thrust. Thus, the axial thrust due to centrifugal force may exert itself fully to squeeze plates 27 and 26 together.

The speed of rotation of output shaft 2ab might then decrease, and/or the torque to be transmitted increase, to the point where the fly-weights no longer exert sufficient squeezing force in clutch 18a. In this case, clutch 18a begins to slip, axial thrusts Pac and Pap emerge and tend to force plates 26 and 27 apart, which further increases slipping and so on until any significant friction in the clutch very rapidly disappears, so that the module then works in reducer operation.

If we consider the case where all the modules 1a–1d work in reducer operation (top of FIG. 1), which achieves the first ratio of the transmission device, the speed is greatest and the torque least in module 1a, as shown by large arrow Fa and small arrow Pac. This first module 1a is therefore the first to pass into direct drive when the vehicle accelerates, as shown at the bottom of FIG. 1. The torque decreases in the second module 1b, because it is no longer increased by gearing down in the first module, but the speeds of rotation in the second module remain unchanged, thus lower than those in the first module just before the change, because they are determined by the speed of rotation of the vehicle's wheels. The vehicle's speed must therefore increase further in order for the second module to reach in its turn the condition for passing into direct drive if the torque provided by the engine remains unchanged. And so on until all the modules of the transmission device are in direct drive. Thus, modules which are all identical, even as regards their settings, provide spaced apart shifting points between the speed ratios.

We shall now describe in greater depth certain details which improve clutch operation, particularly when passing from the engaged to the released state, and which reduce clutch wear and heating.

Figure 4:
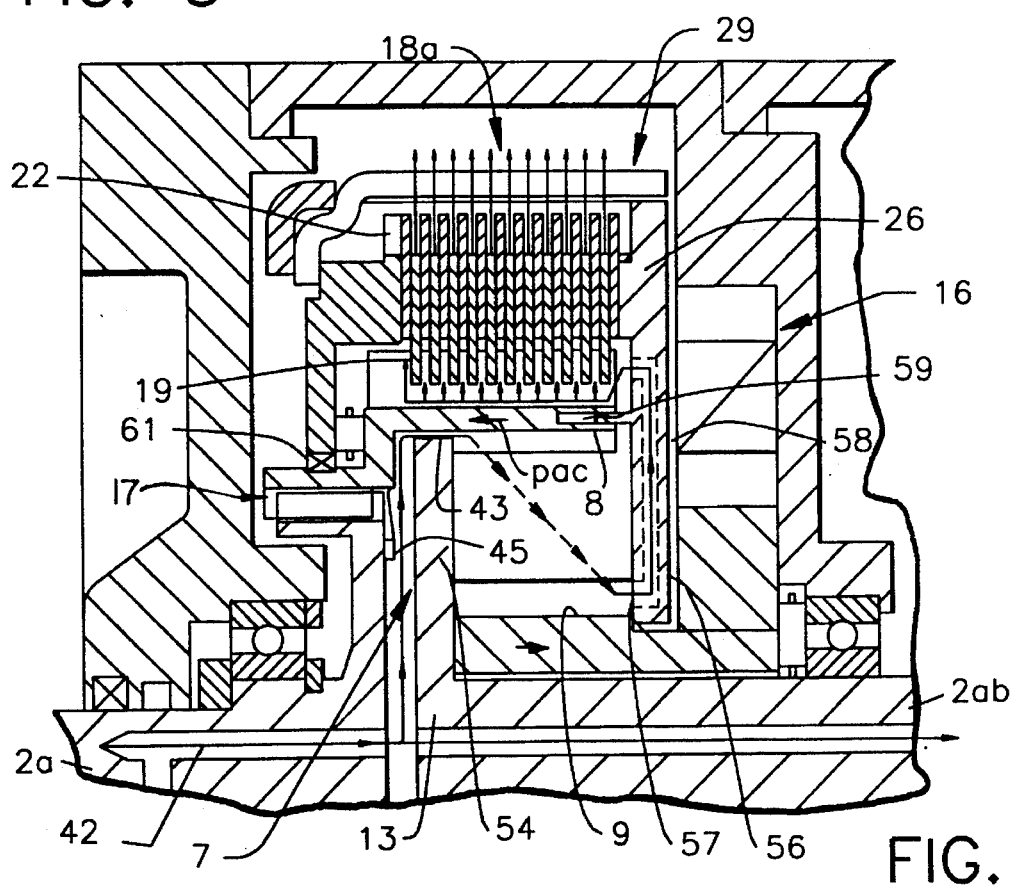
FIG. 4 is a similar view to FIG. 3, but taken along Line IV—IV in FIG. 5.

As FIG. 4 shows schematically, epicyclic train 7 is arranged so as to form an hydraulic gear pump drawing oil up through an axial duct 42 in input shaft 2a and through an annular gap 43 between an outer peripheral edge of planet gear carrier 13 and crown wheel 8. Splines 17 are closed off by a seal 45 preventing air from being drawn in by the hydraulic pump through these splines.

As FIG. 1 shows, axial duct 42 of input shaft 2a is connected by a turning joint system 44 with a duct 46 running through retaining plate 6 and an oil tank 47 fixed under housings 4. The end 48 of channel 46 opens into the bottom of tank 47, so that the suction of the hydraulic pump formed by epicyclic train 7 draws oil from oil tank 47 and brings it to the teeth of the epicyclic train.

Intermediate shafts 2ab, 2bc, 2cd are completely run through axially by ducts 49 which enable the epicyclic train of each of modules 1b, 1c and 1d also to operate as an oil pump by drawing up the oil from duct 46 linked to the bottom of oil tank 47.

FIG. 5 shows how such an oil pump can be made using an epicyclic train. An oil guide-piece 51 is fixed to planet gear carrier 13 close to each planet gear 11 so as to close off the gaps 52 between the teeth of planet gear 11 and 53 of sun gear 9 which during operation move towards the meshing area 54. Moreover, these tooth gaps 52 and 53 are closed off at either axial end by two plates 54 and 56 (FIG. 4) of planet gear carrier 13, which are located either side of planet gears 11 and connected rigidly to output shaft 2ab and fixed plate 26 of the clutch respectively. As FIG. 3 shows, these plates 54 and 56 each support one of the ends of trunnions 14 on which planet gears 11 are mounted.

Returning to FIG. 5, the oil that has arrived through annular gap 43 between crown wheel 8 and sun gear 9, fills all the available space and in particular tooth gaps 52, 53 before these gaps have been closed off by guide-piece 51. Once these tooth gaps 52 and 53 are closed off, the oil can no longer escape. Just at moment when the free volume of the tooth gaps starts to diminish due to the teeth penetrating meshing area 54, tooth gaps 52 and 53 start to communicate with a port 57 through which the oil is delivered at a pressure which depends on the loss of pressure that the oil undergoes along its journey downstream of port 57.

Labyrinth packing 59 forms a seal between crown wheel 8 and plate 56 but still enables axial sliding and relative rotation between them. Port 57 constitutes the end of a delivery duct 58 formed in the thickness of plate 56 and terminating radially between the stack of discs 19, 22 and labyrinth packing 59.

Furthermore, the annular space located between crown wheel 8 and the stack of discs 19, 22 is closed off by a seal 61 mounted between movable plate 27 and crown wheel 8 with the possibility of free rotation between crown wheel 8 and plate 27 around axis 12 of the transmission device.

Thus, the oil delivered by epicyclic train 7 into duct 58 can only escape outwards by passing between discs 19 and 22 of the stack, as illustrated by the row of arrows in FIG. 4. We can foresee that the oil flows through the spaces between the discs when the clutch is in the released state. However, it is preferable to ensure that the space between the discs in the released state is as small as possible to make the axial travel of movable plate 27 in relation to the fixed plate as short as possible, and an attempt is made to make the space between discs 19 and 22 when the clutch is in the released state to be just sufficient to avoid the transmission of torque by friction. Under such conditions, this space is insufficient to enable a free flow of oil and, when the module works in reducer operation, would give rise to poor performance of the transmission due to the fact that the use of the epicyclic train as an hydraulic pump results in significant power consumption.

To avoid this, the discs 22 have been formed, as shown in FIGS. 2 and 6, with radially directed grooves 62 of a depth of, for example, 0.5 mm. There are grooves 62 on both faces of each disc 22, the grooves of one face being offset by a certain angle in relation to those on the other face to avoid mechanically weakening the disc.

Furthermore, as shown in FIGS. 2, 7 and 8, grooves 62 are open through the radially inner edge of discs 22 but closed off by a shoulder 63 at their radially outer end. Shoulder 63 is located facing disc 19 positioned opposite. Thus, as shown in FIG. 7, when the clutch is in the released state, the oil can pass between discs 19 and 22 by following path 66 defined by grooves 62 and a constriction 64 formed between discs 19 and beyond shoulder 63. Since this constriction 64 has a very short radial length, the oil passes through it without excessive loss of pressure. Moreover, this loss of pressure is compensated for by the centrifugaly created pressure within the oil, added to the pressure produced by the pump. The centrifugaly created pressure is great since constrictions 64 are radially distant from axis 12.

As shown in FIG. 8, when the clutch is in the engaged state, constriction 64 is completely closed and the oil's path is cut off.

We shall now describe in more detail the process of engaging clutch 18a. When fly-weights 29 start to rise and push movable plate 27 towards fixed plate 26, discs 19 and 22 move closer together. This starts to close off constrictions 64 (FIGS. 7 and 8) of the oil's path of flow. This retards the flow at the outlet of the oil pump formed by epicyclic train 7 and this increased loss of pressure retards the relative movement of the epicyclic train teeth. When discs 19 and 22 are just in the situation of theoretical mutual contact, namely with no clearance between them but also without engagement, the oil flow path is already in the completely closed off situation shown in FIG. 8. The oil pump is therefore practically blocked, and the epicyclic train practically in direct drive, even before the discs have really begun their work of friction. From this situation, the work of friction of the discs by squeezing the stack only serves to complete immobilization of the epicyclic train teeth and lead to the direct drive situation.

Thus, there is virtually no disc heating or wear. The oil occupying grooves 62 coats the friction faces of discs 19 which, in their turn coat the faces of discs 22 as long as there is relative movement between the discs. This oil which bathes the friction faces further reduces heating and wear.

Ratio changes are made much more smoothly: the relative movement of the epicyclic train teeth begins to slow down as soon as the discs begin to draw towards each other before reaching the position of theoretical contact between each other. Moreover, the pressure existing in grooves 62, which increases as constrictions 64 close, tends to push the discs apart and therefore prevents engagement from occurring abruptly even if, for instance, passage into direct drive results from a sudden disappearance of torque (when the driver releases the accelerator) and consequently fly-weights 29 are suddenly placed in the condition of squeezing the clutch hard. This dampening effect can be adjusted by appropriately choosing the total area of grooves 62 on each face of discs 22, since this is the area on which the oil pressure exerts itself in order to push the discs apart.

After passing through constriction 64, the oil escapes by flowing between blades 24 (FIG. 2) then between the bodies 31 of fly-weights 29, to be projected against the inner wall of housing 4 before falling back into oil tank 47 through an orifice 68 at the bottom of housing 4.

When clutch 18a in the engaged condition becomes incapable of transmitting the prevailing torque, the closing of constrictions 64 does not prevent the clutch from starting to slip so that the process of the module going back to working in reducer operation begins. In fact, the oil delivery path from meshing area 54 (FIG. 5) is linked to several clearances enabling leaks, for example between the faces of planet gears 11 and plates 54 and 56 of planet gear carrier 13. This enables the teeth of the epicyclic train to recommence their relative movement gradually as the clutch slips. Here again the invention, by preventing an abrupt recommencement of movement in epicyclic train 7, excludes jarring during ratio changes.

Even if there were no leakage points in the oil delivery path, seeing that the clutch is no longer capable of transmitting all the torque, part of the transmission would then by performed by the teeth which are stationary in relation to each other, and axial thrust Pac would re-emerge and the clutch would be squeezed still less, and so on until the module would work in reducer operation.

FIG. 6 shows grooves 62 as having the profile of the arc of a circle.

FIG. 9 shows another example with grooves 62 having a triangular profile.

FIG. 10 shows yet another example with grooves 62 having an assymetrical profile defining, at the back of the profile in relation to the direction of relative movement, an oil wedge 67 which encourages the formation of a film of oil behind groove 62 according to relative movement.

Clearly, the invention is not limited to the examples described and shown.

The invention may be applied to any transmission device wherein there is a passage from one ratio to another by immobilizing two sets of intermeshing teeth.

I claim:

1. A ratio change control method in a transmission device comprising a combination of meshing sets of teeth (8, 9, 11) capable of operating in a state of relative mobility in which the combination transmits power in a first speed ratio between a transmission output and input, or in a state of relative fixity to achieve a second speed ratio between the transmission output and input, the combination of meshing teeth taking the form of an hydraulic gear pump (9, 11, 51, 57), in which method the second transmission ratio is controlled by substantially closing off the flow at the gear pump outlet, the first transmission ratio is controlled by releasing the flow at the gear pump outlet, and in order to pass from the first to the second ratio, after having at least partly closed off the flow at the gear pump outlet, a clutch (18a) is made to pass into the coupled state, said clutch tending in the coupled state to make the combination of teeth operate in the state of relative fixity and allowing in the uncoupled state the combination of teeth to assume the state of relative mobility corresponding to the first transmission ratio.

2. A method according to claim 1, characterised in that, in order to control the state of relative mobility, the pump is made to deliver through a gap (64) between the friction elements (19, 22) of the clutch, so that in the clutch-engaged condition this gap (64) disappears and thus causes at least a reduction in the rate of flow at the pump outlet.

3. A transmission device, which has at least two ratios and comprises a combination of teeth (8, 9, 11) capable of operating in a state of relative mobility in which the combination transmits power in a first speed ratio between the transmission input and output or in a state of relative fixity to achieve a second speed ratio between the transmission input and output, means for guiding oil (51, 54, 56) through regions of two sets of teeth (9, 11) in the combination which move towards each other during operation in the first transmission ratio, means (42, 43, 44, 46) for oil intake into the gaps between the teeth (52, 53) in at least one of these regions, an oil delivery path (57, 58, 62, 64) starting from a region (54) where the two sets of teeth (9, 11) start to mesh, ratio change control means (27, 29, 39) for selectively opening or substantially closing off the oil delivery path to control the operation in the first transmission ratio or operation in the second transmission ratio respectively, and a clutch (18a) which selectively connects two rotating elements (8, 13) connected at least indirectly to the sets of teeth (8, 9, 11) of the combination so that the combination of teeth works in the second transmission ratio when the clutch is in an uncoupled state, the ratio change control means also comprising means that, on passing from the first to the second transmission ratio, control the passage of the clutch (18a) to the coupled state after the said oil delivery path has been at least partially closed off.

4. A transmission device according to claim 3, characterised in that the means (27, 29, 39) for selectively opening or substantially closing off the oil delivery path are controlled automatically depending on a speed of rotation and/or a torque transmitted in the transmission device.

5. A transmission device according to claim 3, characterised in that the clutch (18a) is of a friction type in which the friction elements are squeezed together when the clutch is in the coupled state and released to keep the clutch in the uncoupled state.

6. A transmission device according to claim 5, characterised in that a variable space (64) between the friction elements (19, 22) of the clutch substantially disappears when the friction elements are squeezed together, and in that the oil delivery path passes through this variable space (64) which forms part of the means for selectively opening or substantially closing off the oil delivery path.

7. A transmission device according to claim 6, characterised in that at least one of the two opposing friction faces between which the space is formed has grooves (62) which define oilways between the friction elements (19, 22) at least when the friction elements are released and the clutch is consequently in the disengaged condition.

8. A transmission device according to claim 7, characterised in that the grooves (62) are closed off so as to close off the passage of oil in the grooves (62) when the clutch (18a) is in the engaged condition.

9. A transmission device according to claim 8, characterised in that the grooves (62) are closed off at one downstream end relative to the direction of flow of the oil along the grooves.

10. A transmission device according to any one of claim 5, characterised in that the clutch comprises a stack of axially-sliding discs (19, 22) alternately connected in rotation to the two rotating elements of the clutch of which one (21) is integral with a toothed crown wheel (8) of an epicyclic train (7) forming the combination of teeth, and the other (23) is integral with a planet gear carrier (13) of the epicyclic train (7).

11. A transmission device according to claim 10, characterised in that the crown wheel (8) has helical teeth and is mounted so as to slide axially in order to operate the clutch (18a) in the direction of release due to the action of an axial thrust (Pac) generated by the helical teeth, a tachometric means (29) being also provided to push the crown wheel (8) in the direction of clutch engagement with a force that increases with the speed of rotation.

12. A transmission device according to claim 11, characterised in that the tachometric means is of a centrifugal type (29).

13. A device according to any one of claim 10, characterised in that the two rotating elements are radially internal blind splines (21) and radially external splines (23) formed by slots enabling the oil to flow through after having passed through the stack of discs along a path directed radially outwards.

14. A device according to any one of claim 6, characterised in that the oil path (62, 64) is directed radially outwards in the space between the friction elements (19, 22).

\* \* \* \* \*